US006592681B1

(12) United States Patent
Hackett

(10) Patent No.: US 6,592,681 B1
(45) Date of Patent: Jul. 15, 2003

(54) FLOATING OIL BOOM CLEANING APPARATUS

(75) Inventor: Kevin L. Hackett, Kingsland, GA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 10 days.

(21) Appl. No.: 10/041,587

(22) Filed: Jan. 10, 2002

Related U.S. Application Data

(60) Provisional application No. 60/303,742, filed on Jul. 10, 2001.

(51) Int. Cl.$^7$ .................................................. B08B 3/02
(52) U.S. Cl. ........................ 134/32; 134/42; 134/104.2; 134/151; 134/199; 134/201
(58) Field of Search ........................ 134/32, 42, 104.2, 134/131, 148, 151, 199, 201, 123

(56) References Cited

U.S. PATENT DOCUMENTS

| | | |
|---|---|---|
| 317,603 A | 5/1885 | Wilson et al. |
| 1,978,838 A | 10/1934 | Gavlak |
| 2,545,890 A | 3/1951 | McKneely |
| 2,546,862 A | 3/1951 | Marinch |
| 2,647,525 A | 8/1953 | Duda et al. |
| 2,679,225 A | 5/1954 | Heleba |
| 2,705,965 A | 4/1955 | Schulze |
| 2,830,311 A | 4/1958 | Vizdos |
| 3,132,655 A | 5/1964 | Anderson |
| 3,163,559 A | 12/1964 | Thompson et al. |
| 3,561,391 A | 2/1971 | Locati |
| 3,938,532 A | 2/1976 | Babunovic |
| 4,043,166 A | 8/1977 | Leroy |
| 4,049,170 A | 9/1977 | Kawakami et al. |
| 4,340,321 A | 7/1982 | Maheshwary et al. |
| 4,349,039 A | 9/1982 | Egger |
| 4,628,972 A | 12/1986 | LaRochelle |
| 4,658,749 A | 4/1987 | Penalba |
| 4,715,391 A | 12/1987 | Scheller |
| 4,981,151 A | 1/1991 | Larson et al. |
| 5,017,242 A | 5/1991 | Anderson |
| 5,246,394 A | 9/1993 | Jensen |
| 5,267,813 A | 12/1993 | Neal |
| 5,479,869 A | 1/1996 | Coudon et al. |
| 5,566,415 A | 10/1996 | Wallace |
| 5,580,185 A | 12/1996 | Ware |
| 5,607,652 A | 3/1997 | Hellmuth et al. |
| 5,730,061 A | 3/1998 | Stufflebeam |
| 6,176,941 B1 | 1/2001 | Jewett et al. |

Primary Examiner—Philip Coe
(74) Attorney, Agent, or Firm—Steven W. Crabb

(57) ABSTRACT

A floating cleaning device that cleans marine growth from float and skirt type oil booms. The cleaning device is a floating platform with ramps at the front and rear with tracks that guide the movement of the oil boom past a series of spray washers supplied with pressurized water to remove the marine growth from the oil boom.

14 Claims, 6 Drawing Sheets

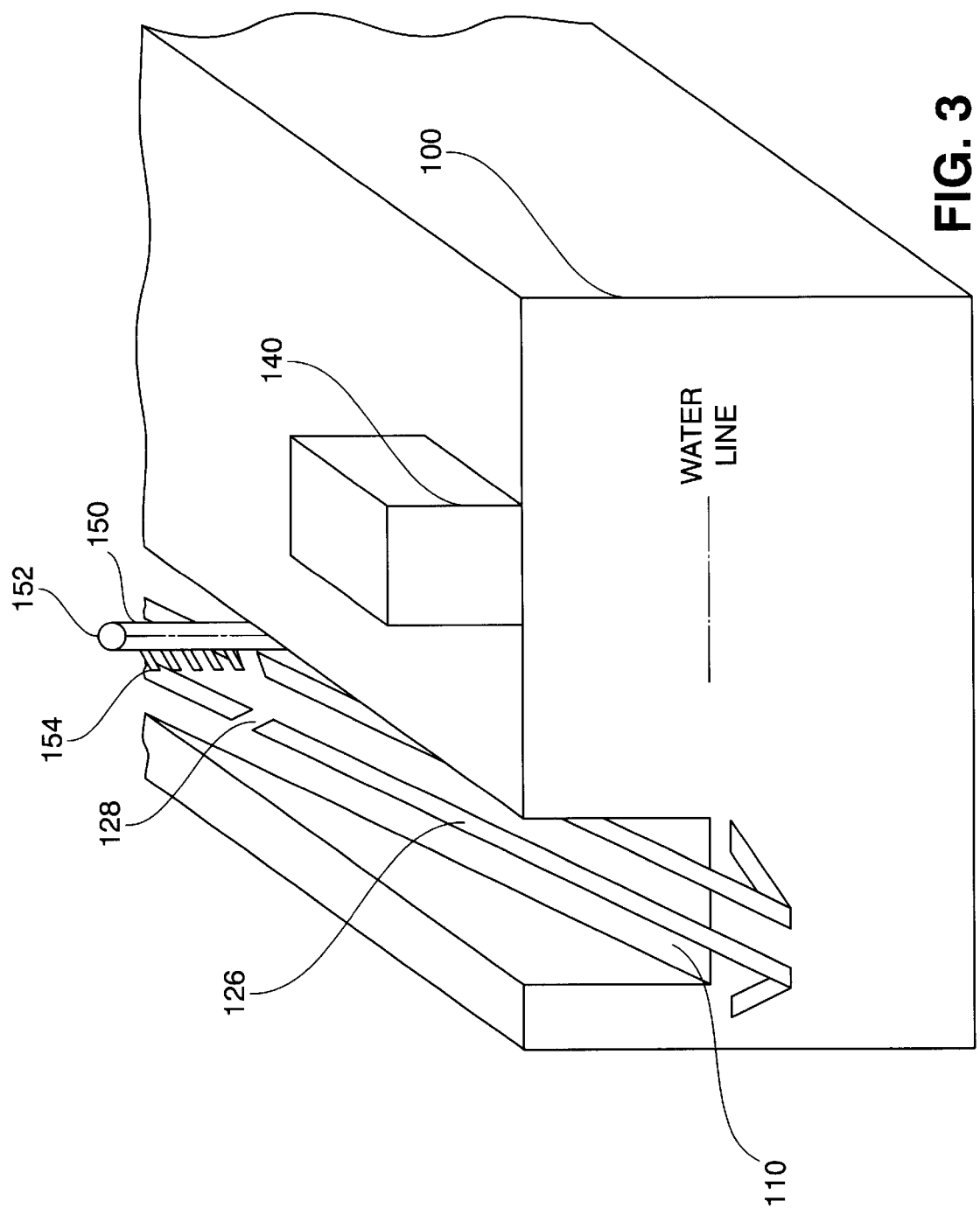

FLOATING OIL BOOM CLEANING APPARATUS

CROSS-REFERENCE TO RELATED APPLICATION

This application claims the benefit of U.S. Provisional Application No. 60/303,742 filed Jul. 10, 2001, entitled "Floating Oil Boom Cleaning Apparatus," incorporated herein by reference.

STATEMENT OF GOVERNMENT INTEREST

The invention described herein may be manufactured and used by or for the Government of the United States of America for governmental purposes without payment of any royalties thereon or therefore.

BACKGROUND OF THE INVENTION

1. Field of the Invention

This invention relates to cleaning an oil boom, and more particularly to an oil boom cleaning device having the capacity to simultaneously clean both sides of float and skirt type oil booms of marine growth or other contaminants.

2. Description of the Related Art

Floating oil booms that are used to contain spills of oil and flotsam and jetsam have been used for many years,. Many of these booms are deployed at the site of the spill. The oil booms are transported by boat to the spill site and when the clean up effort is complete the booms are removed from the water and stored until needed again. However, some booms are used in harbors or at fuel filling stations to contain dockside spills and the booms are left floating in the water in various length sections for quick containment of any spills.

One disadvantage that oil booms kept in the water for quick deployment have over oil booms that are stored dry and deployed as needed is the need for periodic cleaning. Booms stored in the water become havens for marine growth such as algae and barnacles. Without periodic cleanings the booms become heavy, making it harder to pull the booms into position, and negatively affect the boom buoyancy. This negative buoyancy can affect the ability of the boom to contain spills in choppy water. Additionally, boom surface marine growths make clean up of any spills harder because the growth will absorb some of the oil spill requiring the marine growth to be cleaned off the boom and treated as non-reclaimable hazardous waste.

Floating oil booms of the float and skirt type that is suitable to contain oil spills or flotsam and jetsam are well known. Such typical types of booms are shown in U.S. Pat. Nos. 4,049,170; and 5,580,185.

Presently oil booms that are left floating in the water for quick deployment are periodically cleaned in a messy and time consuming effort involving pulling the boom out of the water and scraping the boom by hand. There are known various devices to clean marine growth from boats or ships. Such devices generally would not be suitable to cleaning floating oil booms as the devices are configured to the shapes of hulls and not to the extremely narrow and pliable skirts of oil booms.

It is therefore an important object of the present invention to remove marine growth from both sides of the oil boom simultaneously in a more quick and efficient manner without requiring the removal of the booms from the station area.

It is a further object of this invention to provide a self contained cleaning apparatus that floats and may be towed to a convenient location to clean the floating oil booms without the need for the booms to be taken off station.

SUMMARY OF THE INVENTION

In accordance with the present invention, a cleaning apparatus for removing marine growth from an oil boom comprises a floating platform, a water pressure generator and a pair of tracks to guide the oil boom through a set of pressure spray washers directed at the oil boom surface. Preferably the floating platform includes ramps at the front and rear to allow for a smooth transition from the water to the deck of the floating platform. The floating platform includes a storage tank that may be used to collect the wastewater if it contains any hazardous contaminants.

The floating cleaning apparatus of the present invention preferably is self-contained and does not require a water or power source from the shore or dock. The floating cleaning apparatus includes a diesel or gasoline powered engine that pressurizes water taken from the body of water, whether fresh, salt or brackish, where the cleaning apparatus is floating and then supplies the pressurized water to the spray washers to clean the boom.

Additional objects and advantages of the invention will be set forth in the description which follows, and will in part be obvious from the description, or may be learned from practicing the invention.

BRIEF DESCRIPTION OF THE DRAWINGS

FIG. 3 is a front perspective view showing an example of the front ramp and track according to the present invention.

DESCRIPTION OF THE PREFERRED EMBODIMENTS

Reference to the drawings will be made to describe the preferred embodiments of the present invention.

Figure 1:
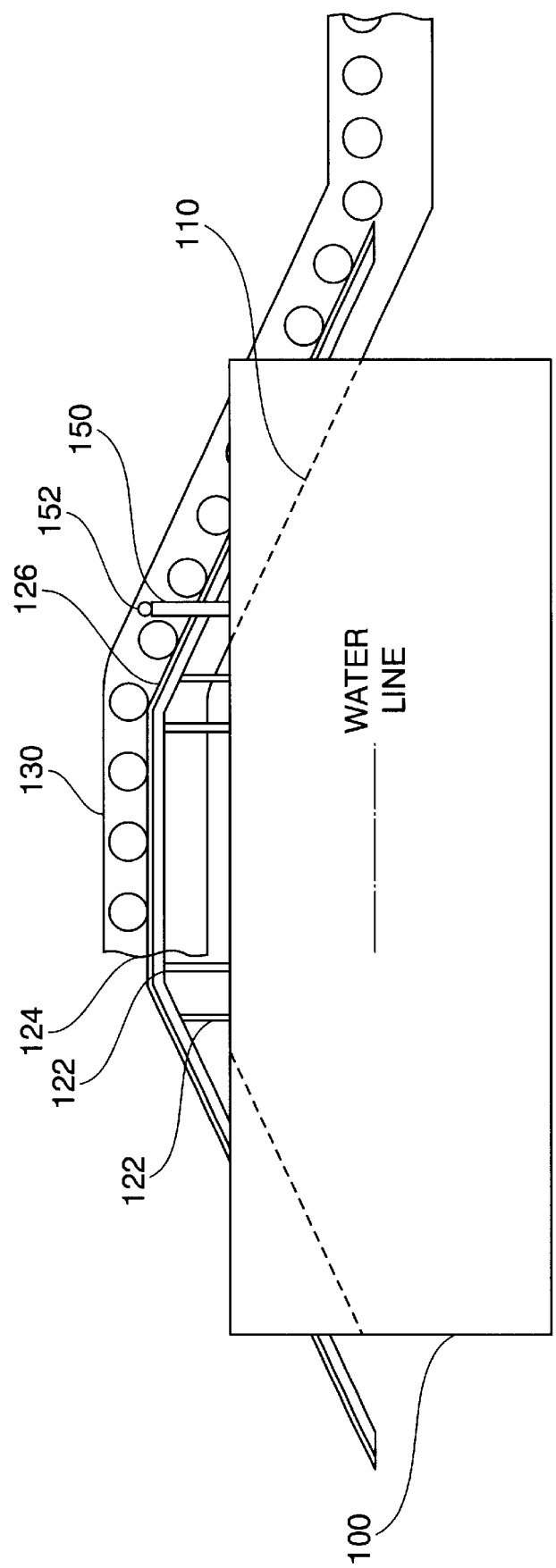
FIG. 1 is a side view of the floating oil boom cleaning apparatus according to the present invention.
Figure 2:
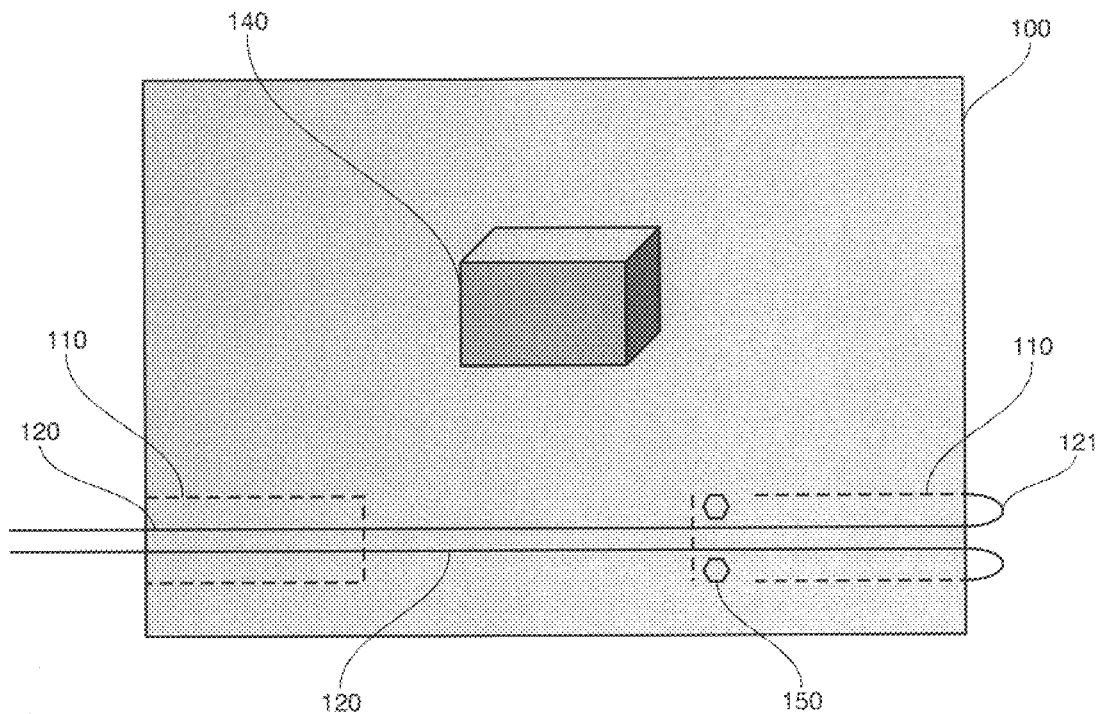
FIG. 2 is a top schematic view of the floating oil boom cleaning apparatus according to the present invention.

As shown in FIG. 1, the oil boom cleaning apparatus comprises a floating platform 100, tracks 120, a spray washer assembly 150, ramps 110, a pressure washer assembly (not shown), and a boat (not shown) or other means for pulling an oil boom 130 through the cleaning apparatus. FIG. 2 shows the general layout of the components on the platform 100. The pressure washer assembly 140 is placed on the floating platform 100 in the preferred embodiment and supply hoses (not shown) are run to the spray washer assemblies 150. By placing the pressure washer assembly 140 on the deck of the floating platform 100 the cleaning apparatus is entirely self-contained and may be towed to any convenient location to clean the oil boom 130.

In the preferred embodiment an oil boom 130 that is floating in a body of water is towed or pulled to the floating platform 100 by a boat or other suitable means (not shown) and is guided into the front guide rails 121 of the track 120. The platform 100 is approximately 20 feet long, 11 feet wide and 5 feet thick with 3 storage tanks (not shown) in the hull. The oil boom 130 is pulled up the front ramp 110 and it passes through a group of spray washer assemblies 150 that clean the oil boom of any marine growth that has accumulated. The debris and wastewater drain back down the ramp to the water. The oil boom 130 continues through the length of the track 120 and down the back ramp 110 where the oil boom 130 is returned to the body of water and towed to any desired location.

Figure 4A:
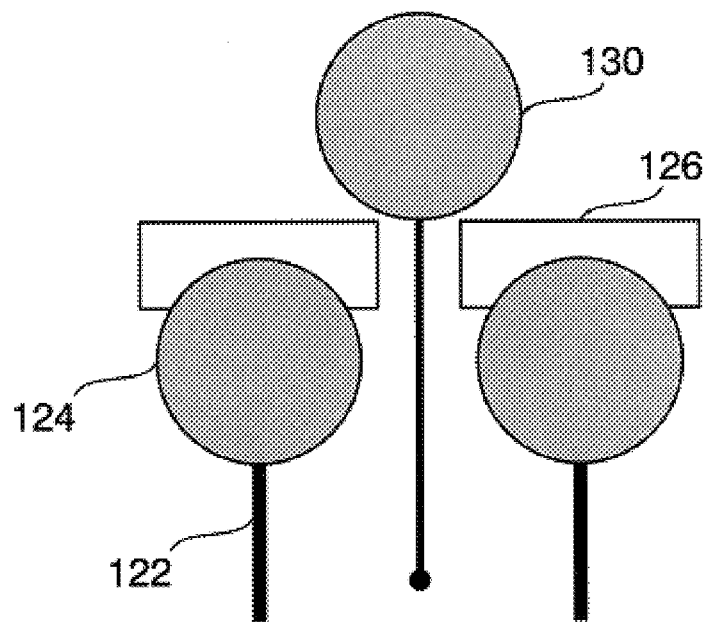
FIG. 4a is an end view of the track assembly of the floating oil boom cleaning apparatus according to the present invention with one type of continuous float and skirt oil boom supported on the track.
Figure 4B:
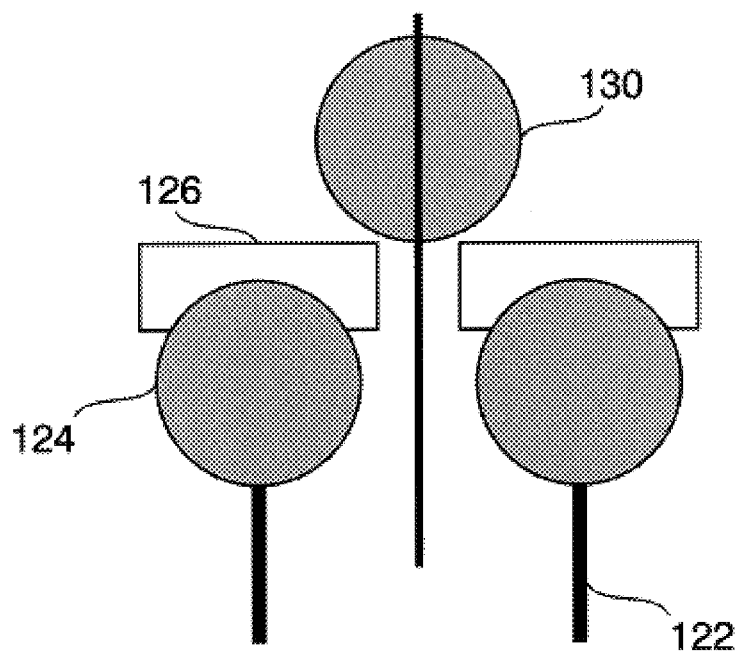
FIG. 4b is an end view of the track assembly of the floating oil boom cleaning apparatus according to the present invention with another type of oil boom that uses spaced floats and a continuous skirt supported on the track.

FIG. 3 shows a more detailed view of the front ramp 110 and the front guide rails 121 of the track 120. The tracks 120 at the front and rear of the platform 100 terminate at the water line to facilitate the passage of the oil boom 130 to and from the water. The tracks 120 at the front and rear ramps 110 transitions at approximately a fifteen-degree rise to the deck 105 of the platform 100. Referring to FIGS. 4a and 4b, the oil boom 130 is shown supported on the track 120 sliding surface 126. The track 120 sliding surface 126 is preferably made of polyethylene or some other low friction easy maintenance surface. Screws attach the sliding surface 126 to a rigid pipe 124. In the preferred embodiment the pipe 124 is made of 1½ inch non-ferrous metal that may be shaped and bent to follow the contours of the ramps 110 and the platform deck 105. The pipe is attached to the platform 100 by several supports 122 spaced along the track 120. In the preferred embodiment the supports are constructed of flat 2-inch non-ferrous metal and are welded or bolted to the platform 100. In the preferred embodiment the track supports 122 are approximately twelve inches high to permit smooth passage of the oil boom 130. The tracks 120 are kept parallel and level with respect to each other for smooth operation. Additionally, the tracks 120 are spaced approximately 2½ inches apart to permit the passage of a towing bridal (not shown).

Figure 5:
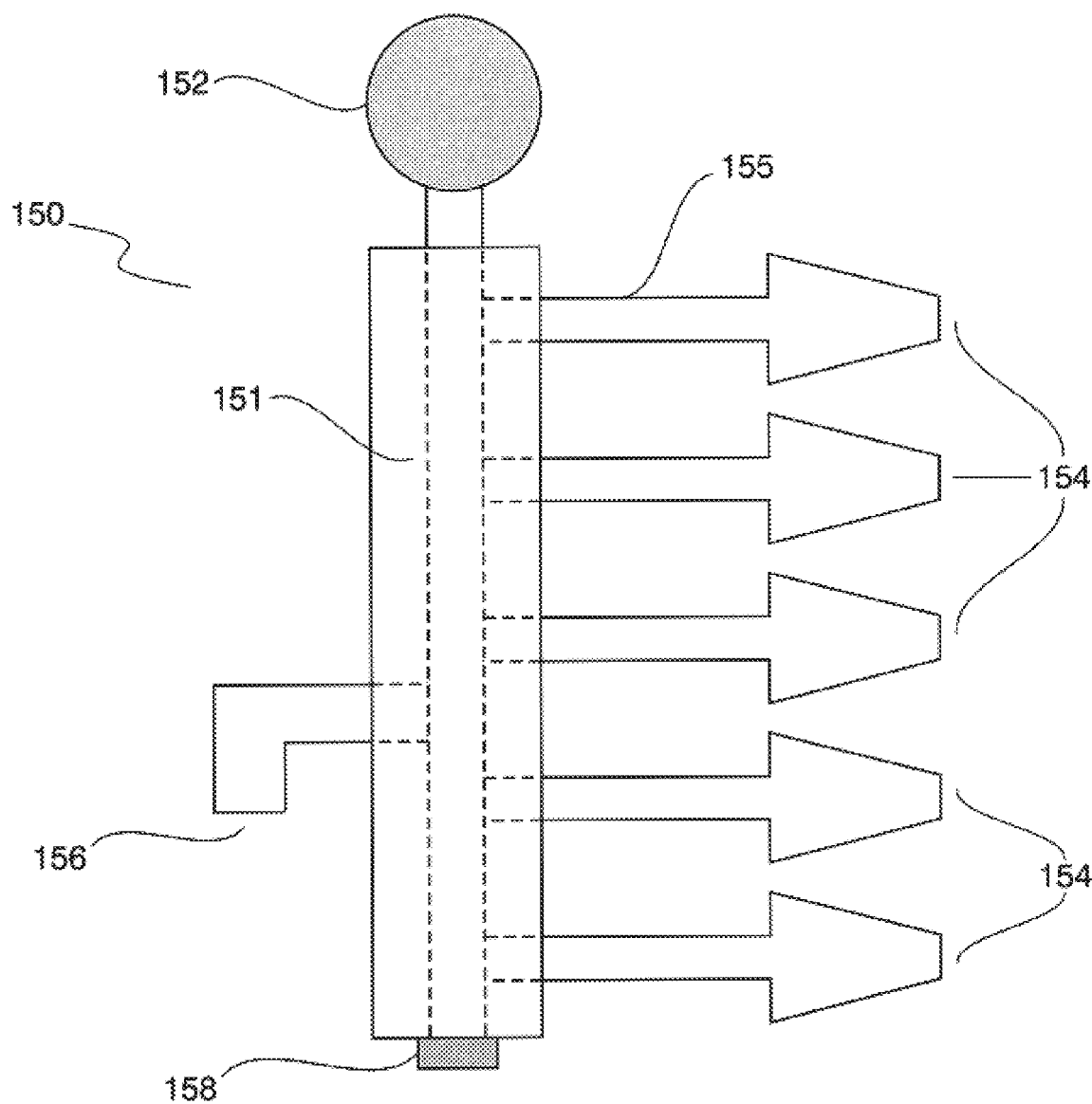
FIG. 5 is a side view of the spray washer assembly of the floating oil boom cleaning apparatus according to the present invention.

The spray washer assembly 150 is shown in FIG. 5. In the preferred embodiment the spray washer assembly consists of five sprayer nozzles 154. Five nozzles 154 were chosen to completely cover the surface area of the oil boom 130, which is approximately 14 inches. The nozzles 154 are zero degree rotating nozzles capable of three gallon per minute throughput. Each nozzle 154 is connected to a common supply manifold 151 through a set of nipples 155. The supply manifold 151 has a pressure gauge 152 attached to the top and a drain plug 158 at the bottom. The drain plug 158 is used for cleaning or draining the supply manifold 151. The supply manifold 151 preferably has a quick disconnect fitting 156 for the water supply pressure hose (not shown) attachment. The spray washer assembly 150 parts are preferably made of stainless steel to reduce corrosion.

The spray washer assembly 150 should be mounted with adjustable mounts (not shown) so that the nozzles 154 may be moved towards, away, up or down with respect to the oil boom 130 surface as needed to effect the most thorough cleaning without causing damage to the oil boom 130. In the preferred embodiment the mounting brackets are slotted to permit the necessary adjustments.

Figure 6:
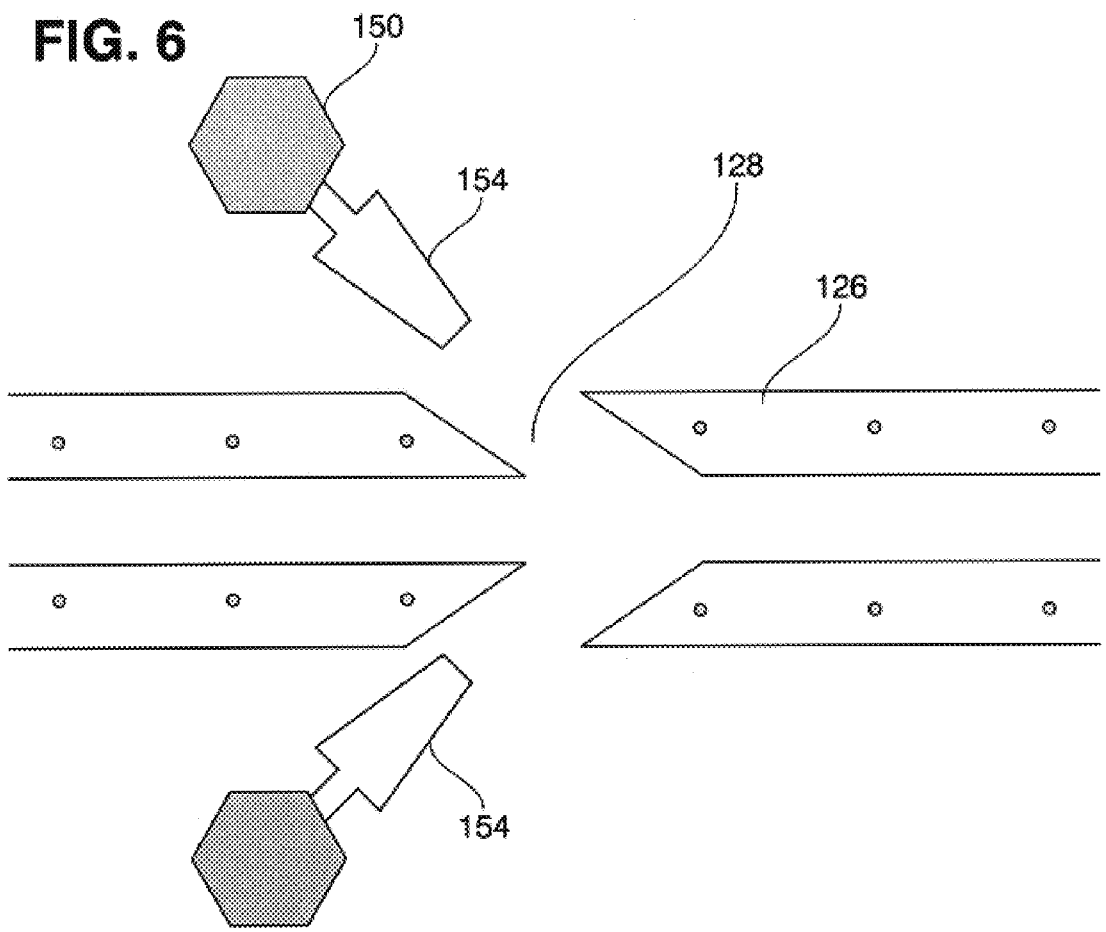
FIG. 6 is a top view of the track assembly and spray washer assembly of the floating oil boom cleaning apparatus according to the present invention.

FIG. 6 shows the relationship of the spray washer assembly 150 and nozzles 154 to the track sliding surface 126. In the preferred embodiment the nozzles 154 direct the pressurized water spray onto the oil boom 130 surfaces at approximately a sixty-degree angle of impact. The track 120 has a gap 128 of approximately 1½ inches that is sized to receive the nozzles 154 so that there is no obstruction between the nozzle 154 water spray and the oil boom 130 surface. The gap 128 is located near the upper edge of the front ramp 110 so that the debris and spray water flows down the ramp to the main body of water.

Figure 7:
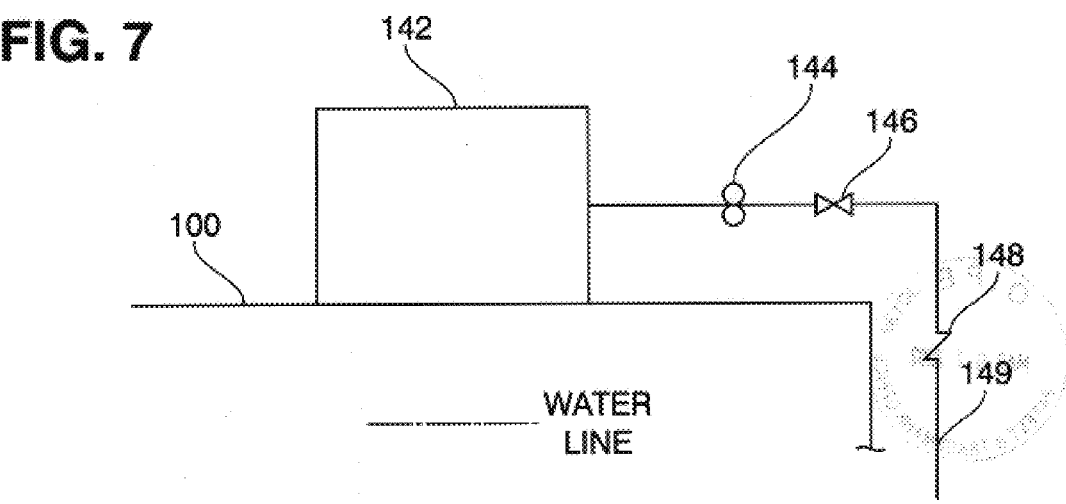
FIG. 7 is a schematic view of the pressure washer assembly of the floating oil boom cleaning apparatus according to the present invention.

Pressure washer assembly 140 is shown in FIG. 7. In the preferred embodiment the pressure washer assembly 140 comprises a diesel engine powered pressure washer 142 and is located on the platform 100. The pressure washer 142 uses whatever body of water the platform 100 is floating on as its working fluid source. The water is pumped from the body of water through a suction check valve 148, through a stop valve 146, and filtered through a strainer 144 prior to entering the pressure washer 142. The piping 149 to the body of water may either go over the side of the platform 100 below the water line or may utilize a penetration through the hull of the platform 100. The pressure washer 142 sends pressurized water at approximately 3000 psi and 15 gpm to each spray washer assembly through supply hoses (not shown) with quick connection fittings.

Though the preferred embodiment is as indicated in the discussion above it is possible to make changes to configure other embodiments. An example, of such a modification would be to place the pressure washer assembly 140 on shore and a supply hose (not shown) would be connected to the spray washer assemblies 150 on the platform 100. The number of nozzles 154 can be varied to cover the width of the oil boom 130 to be cleaned. Each nozzle 154 has approximately three-inch spray coverage at a distance of three inches from the work surface. Other embodiments can be readily made by varying the track 120 height and the distance between the tracks 120 to accommodate different size float and skirt oil booms 130. The platform 100 could be easily adapted to provide a means for propulsion of the platform 100. Additionally, it should be recognized that other means for fastening elements together may be used in place of those disclosed such as glue, rivets, clamps, welds, screws, or bolts.

In another embodiment the oil boom cleaning apparatus could be configured to remove and collect any oily residue left on the oil boom 130 after a spill was contained and cleaned. In this embodiment the platform 100 is modified to slope the center portion of the platform 100 to a drain that empties into a storage tank inside the platform 100 (not shown). The spray washer assembly 150 would be located in the center portion of the platform 100 over a drain rather than at the top edge of the ramp 110. Additionally, a detergent injection system (not shown) would attach to the pressure washer 140 to aid in the removal of the oily waste. The detergent would preferably be a non-ionic detergent that can be separated. The track gap 128 would also be located over the drain area for the nozzle 154 placements. After a spill and cleanup the oil boom 130 is pulled or towed to the floating platform 100 by a boat or other suitable means (not shown) and guided into the front guide rails 121 of the track 120. The oil boom 130 is pulled up the front ramp 110 and as the oil boom transitions to a horizontal attitude it passes through spray washer assemblies 150 that clean the oil boom of any residual oily waste that was left on the oil boom 130 after the cleanup operation. The oily wastewater drains into a storage tank in the platform 100 so that it can be disposed of properly at a later time. The cleaned oil boom 130 continues through the remaining length of the track 120 and down the back ramp 110 where the oil boom 130 is returned to the body of water and towed to any desired location.

What has been described is only a few of many possible variations on the same invention and is not intended in a limiting sense. The claimed invention can be practiced using other variations not specifically described above.

What is claimed is:

1. A cleaning apparatus for removing marine growth from an oil boom comprising:
    a floating platform;
    a pair of tracks on said platform between which movement of the oil boom is guided; and
    at least one spray washer assembly disposed along each said track for directing spray onto the oil boom during said guided movement.

2. The oil boom cleaning apparatus of claim 1 wherein said spray washer assemblies are arranged orthogonally to the oil boom surface to be cleaned.

3. The oil boom cleaning apparatus of claim 1 wherein said spray washer assemblies are arranged at an angle to the oil boom surface to be cleaned.

4. The oil boom cleaning apparatus of claim 3 wherein each of said tracks has a front sloped track section, a middle track section, and a rear sloped track section.

5. The oil boom cleaning apparatus of claim 4 wherein each of said front sloped track section has a gap that is sized to receive said spray washer assemblies.

6. The oil boom cleaning apparatus of claim 5 further comprising a source of pressurized fluid connected to said spray washer assemblies.

7. The oil boom cleaning apparatus of claim 6 wherein said pressurized fluid is water taken from the body of water that said platform is floating upon.

8. The oil boom cleaning apparatus of claim 4 wherein each of said middle track section has a gap that is sized to receive said spray washer assemblies.

9. The oil boom cleaning apparatus of claim 8 further comprising:
    a deck formed on said floating platform;
    a storage tank below the deck of said floating platform; and
    a drain on said deck of said floating platform through which wastewater and debris from the cleaning of the oil boom by said sprays is collected in said storage tank.

10. A cleaning apparatus for removing marine growth from an oil boom comprising:
    a floating platform;
    track means for guiding movement of the oil boom in the water up onto said floating platform and back off said floating platform; and
    washing means on said floating platform for cleaning the oil boom of marine growth while on said floating platform.

11. The oil boom cleaning apparatus of claim 10 wherein said floating platform has ramps at front and rear portions thereof to provide a smooth transition between the water and said floating platform.

12. The oil boom cleaning apparatus of claim 11 wherein said washing means is comprised of a power washer assembly located on said floating platform; and
    at least one spray washer assembly located on said front ramp of said floating platform.

13. The oil boom cleaning apparatus of claim 11 wherein said floating platform further comprises means for collecting and storing wastewater resulting from cleaning of the oil boom.

14. A method for cleaning an oil boom on a floating platform comprising the steps of:
    pulling the oil boom in a floating condition to the floating platform;
    guiding movement of said oil boom onto a front end of said platform;
    pulling said oil boom from the front end along the platform;
    cleaning said oil boom by spraying pressurized fluid against both sides thereof during movement along said platform;
    guiding said movement of said oil boom off the platform after cleaning; and
    pulling said oil boom after cleaning to a desired location.

* * * * *